United States Patent [19]

Geibel et al.

[11] Patent Number: 4,820,800

[45] Date of Patent: Apr. 11, 1989

[54] ARYLENE SULFIDE POLYMERS

[75] Inventors: Jon F. Geibel, Bartlesville, Okla.; Guy Senatore, Borger, Tex.

[73] Assignee: Phillips Petroleum Company, Bartlesville, Okla.

[21] Appl. No.: 160,389

[22] Filed: Feb. 25, 1988

[51] Int. Cl.$^4$ ..................... C08G 75/16; C08G 75/02
[52] U.S. Cl. .................................. 528/388; 528/387
[58] Field of Search ............................. 528/388, 387

[56] References Cited

U.S. PATENT DOCUMENTS

| | | | |
|---|---|---|---|
| 3,354,129 | 11/1967 | Edmonds, Jr. et al. | 260/79 |
| 4,038,261 | 7/1977 | Crouch et al. | 528/388 |
| 4,238,585 | 12/1980 | Bertozzi | 525/535 |
| 4,301,274 | 11/1981 | Campbell | 528/388 |

FOREIGN PATENT DOCUMENTS 0215312  3/1987  European Pat. Off. .
3529498  2/1987  Fed. Rep. of Germany .
3529501  2/1987  Fed. Rep. of Germany .

OTHER PUBLICATIONS

J. Miller, Aromatic Nucleophilic Substitution, 1968, Elsevier Publishing Co., pp. 76–89.

*Primary Examiner*—Harold D. Anderson
*Assistant Examiner*—T. Mason
*Attorney, Agent, or Firm*—J. D. Brown

[57] ABSTRACT

A process for the production of arylene sulfide polymers is provided which comprises subjecting a mixture of at least one sulfur source, at least one organic monohalo compound, at least one polyhalo-substituted aromatic compound and at least one polar organic compound to polymerization conditions sufficient to produce the arylene sulfide polymer. The organic monohalo compound can be added at any time prior to substantial completion of polymerization to provide arylene sulfide polymers of increased extrusion rate.

21 Claims, No Drawings

ARYLENE SULFIDE POLYMERS

FIELD OF INVENTION

This invention relates to processes for the production of arylene sulfide polymers. In one aspect, this invention relates to processes for the production of phenylene sulfide polymers. In another aspect, this invention relates to processes for the production of arylene sulfide polymers having a high extrusion rate. In a further aspect, this invention relates to processes for the production of poly(p-phenylene sulfide) having a high extrusion rate.

BADKGROUND OF THE INVENTION

U.S. Pat. No. 3,354,129 discloses a basic process for the production of arylene sulfide polymers from polyhalo-substituted aromatic compounds by reaction with an alkali metal sulfide in a polar organic solvent. Since then much work has been done to provide methods of modifying or controlling the melt flow rate of arylene sulfide polymers thus produced. For example, the use of curing or chain extension reactions are known for decreasing the melt flow rate. In addition, the use of alkali metal carboxylates and/or polyhalo-substituted aromatic compounds having three or more halogen atoms per molecule in the polymerization reaction mixture also is known to reduce melt flow rate. On the other hand the use of excess dihalo-substituted aromatic compound reactant is also known to provide arylene sulfide polymers of increased melt flow rate.

Previous attempts to employ monohalo-substituted aromatic compounds as polymerization modifiers to obtain arylene sulfide polymers of increased melt flow rate have given generally unsatisfactory results because: (1) either the monohalo compound was so unreactive that it could not compete with the polyhalo-substituted aromatic compound monomer and thus had essentially no effect on the polymer produced in its presence; or (2) the monohalo compound, while activated relative to the polyhalo-substituted aromatic compound, possessed an activating group which was unstable under polymerization and/or polymer recovery conditions thus promoting polymer instability.

It is generally considered that a melt flow rate is inversely related to polymer molecular weight. Extrusion rate is a specific type of melt flow rate particularly useful for characterizing arylene sulfide polymers in the lower molecular weight range. As used herein, the term extrusion rate effects to a flow rate measurement on molten polymer based on ASTM D1238, Procedure B-Automatically Timed Flow Rate Measurement, Condition 315/0.345, using a five minute preheat time and an orifice having the dimensions of 0.0825±0.0002 inch diameter and 1.250±0.002 inch length.

There is a growing need for arylene sulfide polymers of high extrusion rate for use in applications such as encapsulation of electronic components and in coatings formulations. Current methods for reproducibly preparing such arylene sulfide polymers of high extrusion rate suffer from various drawbacks such as the need for recycling excess reactants which can entail costly added separation steps.

It is therefore an object of this invention to provide a method for producing arylene sulfide polymer of a desired extrusion rate in a readily controllable manner. It is another object of this invention to provide a method for producing arylene sulfide polymer having a high extrusion rate. It is another object of this invention to provide a method for producing poly(p-phenylene sulfide) having an extrusion rate of about 50 to 1,000 g/10 min.

BRIEF STATEMENT OF THE INVENTION

We have discovered a process for preparing arylene sulfide polymer comprising adding, at any time prior to substantial completion of polymerization, as a further component, at least one organic monohalo compound to a polymerization reaction mixture comprised of at least one sulfur source, at least one polyhalo-substituted aromatic compound, and at least one polar organic compound. The organic monohalo compound of our invention exhibits enhanced halide reactivity yet does not promote polymer instability.

DETAILED DESCRIPTION OF THE INVENTION

According to one embodiment of our invention we have discovered a method for increasing the extrusion rate of arylene sulfide polymer in a readily controllable manner by including at least one organic monohalo compound in a polymerization reaction mixture comprised of at least one sulfur source, at least one polyhalo-substituted aromatic compound, and at least one polar organic compund and subjecting said reaction mixture to polymerization conditions sufficient to produce said arylene sulfide polymer. The amount of organic monohalo compound employed according to our invention is an amount effective to provide arylene sulfide polymers of increased extrusion rate. In this manner arylene sulfide polymers having an extrusion rate of at least about 50 g/10 minutes, preferably about 75 to about 1000 g/10 minutes, more preferably about 100 to about 500 g/10 minutes, are readily produced.

The organic monohalo compound which is utilized according to our invention is selected from the group of compounds represented by the formulas:

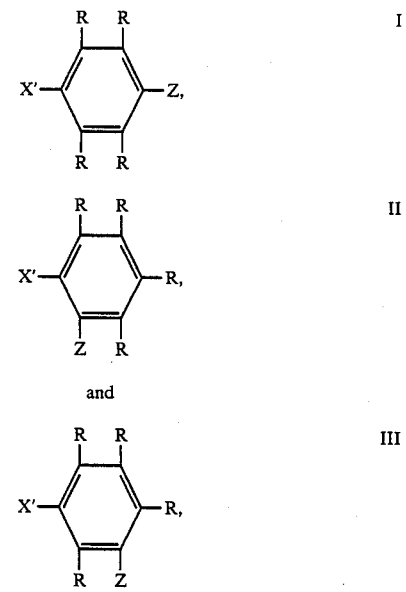

In said formulas I, II and III, X' is a halogen selected from the group consisting of fluorine, chlorine, bromine and iodine; R is hydrogen or an alkyl radical of 1–4 carbon atoms; and Z is an activating group selected from the group consisting of

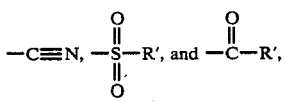

wherein R' is phenyl or an alkyl radical of 1–12 carbon atoms and wherein R' can also be attached to the ring bearing X' by a valence bond or an alkylene bridging group of 1–12 carbon atoms thereby replacing an R on said ring at the point of attachment.

Of the organic monohalo compounds represented by formulas I, II, and III, those of formula I are most preferred for reasons of availability and good halogen reactivity. Compounds represented by formula III are least preferred based on the same considerations. It is preferred that the halogen X' be chlorine in the organic monohalo compounds for reasons of availability, cost and generally good reactivity.

Examples of suitable organic monohalo compounds for use according to our invention include 4-chlorobenzonitrile, 2-chlorobenzonitrile, 3-chlorobenzonitrile, 4-fluorobenzonitrile, 2-fluorobenzonitrile, 3-fluorobenzonitrile, 4-bromobenzonitrile, 2-bromobenzonitrile, 3-bromobenzonitrile, 2-iodo-9fluorenone, p-bromobutylrophenone, 4-chlorobenzophenone, 2-chlorobenzophenone, p-chloroacetophenone, o-chloroacetophenone, p-chloropropiophenone, p-chlorophenyl phenyl sulfone, m-bromopropiophenone, p-bromopropiophenone, p-bomovalerophenone, p-fluoropropiophenone, 4-fluorobenzophenone, o-fluoroacetophenone, m-fluoroacetophenone, p-fluoroacetophenone, p-fluorophenyl phenyl sulfone, o-chlorophenyl phenyl sulfone, p-bromophenyl phenyl sulfone, 3-chloro-9-fluorenone, 4-chloro-9-fluorenone, 3-fluoro-9-fluorenone, We have found that organic monohalo compounds represented by formulas I, II and III as defined above possess the requisite enhanced halide reactivity to effectively compete with the polyhalo-subsitited aromatic compound for polymer-sulfur moiety in the polymer chain growth reaction thus providing arylene polymers of increased extrusion rate. In addition, the activting groups in said organic monohalo compounds employed according to our invention are sufficiently stable such that the resulting arylene sulfide polymers do not exhibit increased instability.

The amount of organic monohalo compound employed according to our invention is an amount effective to provide arylene sulfide polymers of increased extrusion rate and is conveniently expressed in terms of a molar ratio of organic monohalo compound to sulfur source which is broadly about 0.001:1 to about 0.1:1, preferably about 0.004:1 to about 0.02:1.

According to our invention, the organic monohalo compound can be added to the mixture of components at any time prior to sustantial completion of polymerization. Thus, the organic monohalo compound can be added in total initially with the mixture of components to be subjected to polymerization conditions. Alternatively, a portion of the organic monohalo compound can be added initially with the balance added in a single portion or multiple increments during the polymerization period. As a further alternative, no organic monohalo compound is added initially but is added in a single portion or in multiple portions during the polymerization period but prior to substantial completion of polymerization. However, for best results the organic monohalo compound should not be added to the mixture containing the sulfur source prior to the addition of the polyhalo-substituted aromatic compound. If such a sequence were to be followed the organic monohalo compound would be substanitally consumed in a self-condensation reaction to form a halogen-free organic sulfide which would be essentially inert toward subsequent polymerization of the polyhalo-substituted compound.

The organic monohalo compound can be added neat or in admixture with the polyhalo-substituted compound. It is particularly convenient to add the organic monohalo compound in admixture with a portion of the polar organic compound component that is to be utilized.

According to our invention, compounds suitable as the sulfur source include alkali metal sulfides, alkali metal hydrosulfides, N-methyl-2-pyrrolidinethione, and hydrogen sulfide. Suitable alkali metal sulfides include lithium sulfide, sodium sulfide, potassium sulfide, rubidium sulfide and cesium sulfide. Suitable alkali metal hydrosulfides include lithium hydrosulfide, sodium hydrosulfide, potassium hydrosulfide, rubidium hydrosulfide and cesium hydrosulfide. Sodium sulfide and sodium hydrosulfide are presently preferred as suitable sulfur source. It is often convenient to employ these sulfur source compounds as aqueous solutions or dispersions in the process of our invention.

The polyhalo-substituted aromatic compounds which can be employed in the method of our invention are compounds wherein the halogen atoms are attached to aromatic ring carbon atoms. Preferably, the polyhalo-substituted aromatic compounds are selected from the group consisting of p-dihalobenzenes having the formula

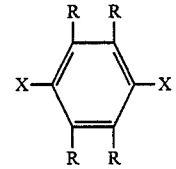

m-dihalobenzenes having the formula,

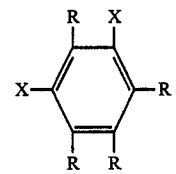

and o-dihalobenzenes having the formula

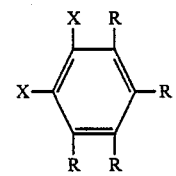

wherein X is a halogen selected from the group consisting of chlorine, bromine and iodine and R is hydrogen or an alkyl radical of 1–4 carbon atoms. For reasons of availability and generally good results it is more preferred that dichlorobenzenes be employed according to our invention with p-dichlorobenzene being especially preferred. Mixtures of suitable polyhalo-substituted aromatic compounds can be employed according to our invention.

Further, according to our invention, though presently less preferred, poly-halo-substituted aromatic compounds having more than two halogen substituents per molecule can be employed. These compounds are represented by the formula $R''(X)_n$ wherein X is a previously defined, $R''$ is a polyvalent aromatic radical of 6 to about 16 carbon atoms having a valence n and n is an integer of 3–6. Generally, the polyhalo-subsituted aromatic compounds represented by the formula $R''(X)_n$ when employed according to our invention are optional components utilized in small amounts in admixture with suitable dihalo-substituted aromatic compounds.

Examples of some suitable polyhalo-substituted aromatic compounds include 1,4-dichlorobenzene, 1,3-dichlorobenzene, 1,2-dichlorobenzene, 1,4-dibromobenzene, 1,4-diiodobenzene, 1-chloro-4-bromobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,3-trichlorobenzene, 1,2,4-trichlorobenzene, 1,3-dichloro-5-bromobenzene, 2,4,6-trichlorotoluene, hexachlorobenzene, 2,2',4,4'-tetrachlorobiphenyl, 2,2', 6,6'-tetrabromo-3,3',5,5'-tetramethylbiphenyl, 4,4'-dichlorobiphenyl, and the like.

Although the amount of polyhalo-substituted aromatic compound relative to the sulfur source compound can vary over a wide range, generally the amount will be such that about 0.5 gram equivalents of total aromatic halide per gram equivalent of sulfur source compound to about 2 gram equivalents of total aromatic halid per gram equivalent of sulfur source compound are employed. Preferably, the ratio will be about 0.95:1 to about 1.1:1 expressed on the same basis as before. By gram equivalents of total aromatic halide is meant the sum of gram equivalents of organic monohalo compound employed and gram equivalents of polyhalo-substituted aromatic compound utilized.

Polar organic compounds which can be employed according to the process our invention include organic amides, lactams, ureas, sulfones and the like. Examples of suitable polar organic compounds include N-methyl-2-pyrrolidone, N-methylcaprolactlam, hexamethylphosphoramide, tetramethylurea, N,N'-ethylene dipyrrolidone, pyrrolidone, caprolactam, N-ethylcaprolactam, 1,3-dimethyl-2-imidazolidinone, tetramethylene sulfone, N-ethyl-2-pyrrolidone, 1-methyl-4-isopropyl-2-piperazinone, 1,4-dimethyl-2-piperazinone, and mixtures thereof. For reasons of availability, stability and generally good results N-methyl-2-pyrrolidone is a preferred polar organic compound for use according to our invention. The amount of polar organic compound employed according to the process of our invention can be expressed in terms of a molar ratio of polar organic compound to sulfur source compounds. Thus, this ratio will b about 1.5:1 to about 25:1, preferably about 2:1 to about 8:1.

Although the reaction temperature at which the polymerization is conducted can vary over a wide range, generally it will be about 125° C. to about 375° C., preferably about 175° C. to about 350° C. The reaction time can vary widely, depending in part on the reaction temperature, but generally will be about six minutes to about 72 hours, preferably about one hour to about eight hours. The pressure should be sufficient to maintain the organic components of the reaction mixture substantially in the liquid phase.

The arylene sulfide polymers produced by the process of our invention can be separated from the reaction mixture by conventional procedures, e.g. by filtration of the polymer, followed by washing with water of by dilution of the reaction mixture with water, followed by filtration and water washing of the polymer.

The arylene sulfide polymers produced by the process of our invention can be blended with fillers, pigments, extenders, other polymers, and the like. The polymers can be cured through crosslinking and/or chain extension, e.g., by heating at temperatures up to about 480° C. in the presence of a free oxygen-containing gas, to provide cured products having high thermal stability and good chemical resistance. They are useful in the production of coatings, films, molded objects, and fibers.

EXAMPLES

Examples are provided in an effort to assist one skilled in the art to a further understanding of our invention, and yet not be unduly limitative of the reasonable scope of the invention. The particular reactants, conditions, ratios, and the like, are all intended to the illustrative of our invention and not limitative of the reasonable and suitable scope thereof.

EXAMPLE I

A series of polymerization runs were performed in a one liter, fast stirring stainless steel autoclave. Heating was accomplished by electric heating mantles. The autoclave was equipped with manually controlled cooling coils, a safety pressure rupture disc, manually controlled pressure release ports, isolable distillation condenser, and isolable monomer charging cylinder. The autoclave and charging cylinder both had pressure gauges and nitrogen inlet valve. The temperature of the reaction mixture was recorded by a J-type thermocouple in a thermocouple well in the autoclave. The temperature was displayed on a digital thermocouple readout.

A typical 1.00 mole scale polymerization was performed according to the following procedure: The autoclave was charged with aqueous sodium hydrolsulfide (1.00 mole, 95.97 grams, 58.481 weight percent NaSH), sodium hydroxide (1.05 moles, 42.0 grams), and N-methyl-2-pyrrolidone (241.6 mL, 2.50 moles).

The autoclave was sealed up, agitation was started, and degassing was accomplished by pressurizing the reactor to 200 psig with nitrogen and the releasing the pressure for a total of six pressurize-release cycles. The autoclave was then heated rapidly to approximately 150° C. A slow nitrogen purge (0.5 SCFH) was then flushed through the autoclave into the overhead take-off condenser. Approximately 40 mL of condensate was collected as heating was continued from 160° C. to 202° C. over the course of 40–45 minutes. Collection of condensate essentially stopped when all the water was removed.

At the conclusion of the dehydration the autoclave was sealed up and cooled to 160° C. with the internal cooling coils. At this time a solution of p-dichlorobenzene (variable) and, optionally, as exemplary of the organic monohalo compound, 4-chlorobenzophenone (4-CBP) in N-methyl-2-pyrrolidone (NMP) 1.00 mole (96.6 mL) was pressured into the autoclave followed by a rinse of 0.2 mole NMP. The autoclave was then "blocked in" and the temperature raised to 245° C. and held for three hours. The reaction mixture was then allowed to cool overnight.

The crude product was washed with hot (90° C.) distilled water and collected by filtration. The washing procedure was repeated typically eight times with 2-liter portions of the hot water. The product was then dried to a constant weight in a vacuum oven at 80° C. The reslulting polymer was a white, free flowing powder. Extrusion rates were measured on molten polymer based on ASTM D1238, Procedure B-Autommatically Timed Flow Rate Measurement, Condition 315/0.345, using a 5 minute preheat time and an orifice having the dimension of 0.0825±0.002 inch diameter and 1.25±0.002 inch length. Results are reported in g/10 minutes.

The polymerization recipe employed for this series of runs is shown below.

| Compound | g-mole |
| --- | --- |
| N—methyl-2-pyrrolidone (NMP) | 3.70 |
| Sodium hydroxide (NaOH) | 1.05 |
| Sodium hydrosulfide (NaSH) | 1.00 |
| 4-Chlorobenzophenone (4-CBP) | Variable |
| p-Dichlorobenzene (p-DCB) | Variable |

The results from the runs are presented in Table I below.

TABLE I

| Run No. | g-mole | | Extrusion Rate g/10 min |
| --- | --- | --- | --- |
| | p-DCB | 4-CBP | |
| 1 | 1.030 | 0 | 60 |
| 2 | 1.0275 | 0.005 | 104 |
| 3 | 1.025 | 0.010 | 211 |
| 4 | 1.020 | 0.020 | 612 |

Run 1 is a control run which employed no organic monohalo compound (4-CBP) while invention Runs 2-4 employed increasing amounts of 4-CBP. The extrusion rates for the polymers from Runs 2-4 show a significant large increase corresponding to the amount of 4CBP employed.

EXAMPLE II

Additional larger scale runs were made according to our invention utilizing a 90 gallon stirred reactor (about 400 rpm) for the preparation of poly(p-phenylene sulfide) (PPS). These runs employed N-methyl-2-pyrrolidone (NMP), aqueous NaOH, aqueous NaSH, p-dichlorobenzene (p-DCB), and 4-chlorobenzophenone (4CBP) as exemplary of the organic monohalo compound (except in control runs) in the process for preparing PPS.

A typical run in this series employed the following general procedures. The aqueous NaOH and aqueous NaSH were premixed in a separate heated vessel. The warmed (about 115° C.) liquid mixture was charged, with a following NMP flush, to the reactor containing the remaining NMP. This mixture was subjected to a dehydration step wherein water plus some NMP was removed from the reactor by distillation at a reflux ratio of 1/1. Takeoff overhead started at a reactor temperature of 166° C. and ended at 230°-233° C. over a period of about 85-90 minutes.

Molten p-DCB was then charged to the reactor at about 225°-230° C. and the reaction mixture held at about 230° C. for one hour than at about 275° C. for 1.5 hours. If 4-CBP was used, it was charged with the aid of about 2 gallons of NMP to the reactor at about 225° C. immediately after the addition of p-DCB for this series of runs.

The reactor was vented with recovery of volatiles over about one hour to 55 psig, heated at about 282° C. and the reactor contents then transferred to another vessel wherein reduced pressure conditins caused the remaining NMP and other volatiles to be flashed overhead for recovery.

The reaction mixture comprising PPS was washed several times with water utilizing a PPS slurry mixing tank then a nylon fabric moving belt filter system to separate the PPS from the wash/rinse liquid. The washed PPS obtained from each run was dried and a sample tested for extrusion rate according to the method described above.

The results obtained for this series of runs are presented in Table II below. The molar ratios shown are values normalized to NaSH of 1.000.

TABLE II

| Run No. | Molar Ratio[a] | | | Extrusion Rate g/10 min |
| --- | --- | --- | --- | --- |
| | NaOH | p-DCB | 4-CBP | |
| 5 | 0.985 | 1.007 | 0 | 35 |
| 6 | 0.985 | 1.007 | 0 | 50 |
| 7 | 0.985 | 1.007 | 0.0039 | 100 |
| 8 | 0.985 | 1.007 | 0.0039 | 97 |
| 9 | 0.985 | 1.007 | 0.0039 | 75 |
| 10 | 0.984 | 1.025 | 0.0080 | 231 |
| 11 | 0.984 | 1.025 | 0.0080 | 232 |

[a]Relative to NaSH of 1.000, normalized. The runs actually employed 0.924 lb-mole of NaSH in each run.

Runs 5 and 6 were control runs which employed no organic monohalo compound. Invention Runs 7;14 9 show that the extrusion rate can be essentially doubled by using only a small amount of an organic monohalo compound, here 4-CBP, in the polymerization mixture. Results from invention Runs 10 and 11 show that utilization of a larger amount of 4-CBP relative to NaSH provides an even greater increase in extrusion rate compared with the control runs.

That which is claimed is:

1. A process for preparing arylene sulfide polymer comprising:

(a) admixing at least one sulfur source, at least one polyhalo-substituted aromatic compound, at least one polar organic compound and at least one organic monohalo compound selected from the group of compounds represented by the formulas:

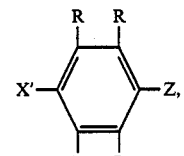

I

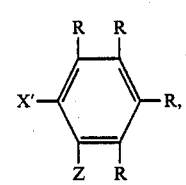

II

-continued and

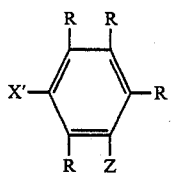   III wherein X' is a halogen selected from the group consisting of fluorine, chlorine, bromine and iodien; R is selected from the group consisting of hydrogen and an alkyl group of 1-4 carbon atoms; and Z is an activating group selected from the group consisting of

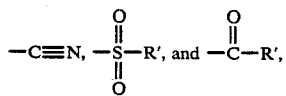

where R' is selected from the group consisting of phenyl, an alkyl radical of 1-12 carbon atoms, phenyl to the ring bearing X' by a valence bond or an alkylene bridging group of 1-12 carbon atoms, and an alkyl radical of 1-12 carbon atoms attached to the ring bearing X' by a valence bond or an alkylene briding group of 1-12 carbon atoms and (b) subjecting said admixture to polymerization conditions sufficient to produce a polymerization reaction mixture comprising said arlyene sulfide polymer.

2. A process according to claim 1 wherein said sulfur source is selected from the group consisting of N-methyl-2-pyrrolidinethione, hydrogen sulfide, alkali metal sulfides and alkali metal hydrosulfides.

3. A process according to claim 2 wherein the molar ratio of said organic monohalo compound to said sulfur source is about 0.001:1 to about 0.1:1.

4. A process according to claim 3 wherein said polyhalo-substituted aromatic compound is selected from the group consisting of p-dihalobenzenes having the formula:

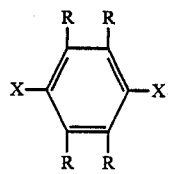

, m-dihalobenzenes having the formula

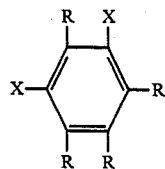

, o-dihalobenzense having the formula

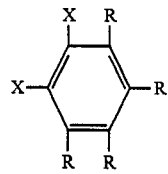

, and mixtures thereof, wherein X is a halogen selected from the group consisting of chlorine, bromine and iodine, and R is selected from the group consisting of hydrogen and an alkyl radical of 1-4 carbon atoms.

5. A process according to claim 4 wherein said polar organic compound is selected from the group of amides, sulfones and ureas.

6. A process according to claim 5 wherein said organic monohalo compound comprises 4-chlorobenzophenone, said polar organic compound comprises N-methyl-2-pyrrolidone, said polyhalo-substituted aromatic compound comprises p-dichlorobenzene, and said sulfur source comprises sodium hydrosulfide.

7. A process according to claim 6 wherein said polymerization conditions include a temperature of about 125° C. to about 375° C. and a time of about 0.1 hour to about 72 hours.

8. An arylene sulfide polymer produced by the method of claim 1 having an extrusion rate of at least about 50 g/10 minutes.

9. An arylene sulfide polymer produced by the method of claim 7 having an extrusion rate of about 75 to about 1000 g/10 minutes.

10. A process for preparing arylene sulfide polymer comprising (a) admixing at least one sulfur source, at least one polyhalo-substituted aromatic compound, and at least one polar organic compound to form an admixture; and (b) subjecting said admixture to polymerization conditions sufficient to product a polymerization reaction mixture comprising said arylene sulfide polymer wherein there is added to said polymerization reaction mixture after polymerization commences but prior to substantial completion of polymerization at least one organic monohalo compound selected from the group of compounds having the formulas:

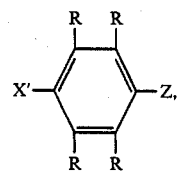   I

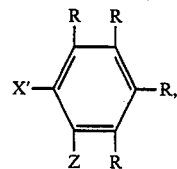   II and

-continued

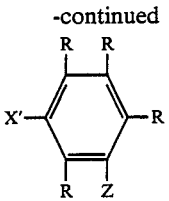 III wherein X' is a halogen consiting of fluorine, chlorine, bromine and iodine; R is selected from the group consisting of hydrogen and an alkyl group of 1-4 carbon atoms; and Z is an activating group selected from the group consisting of

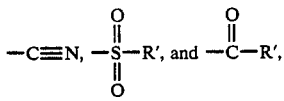

where R' is selected from the group consisting of phenyl, an alkyl radical of 1-12 carbon atoms, phenyl attached to the ring bearing X' by a valence bond or an alkylene bridging group of 1-12 carbon atoms, and an alkyl radical of 1-12 carbon atoms attached to the ring bearing X' by a valence bond or an alkylene bridging group of 1-12 carbon atoms.

11. A process according to claim 10 wherein said sulfur source is selected from the group consisting of N-methyl-2-pyrrolidinethione, hydrogen sulfide, alkali metal sulfides and alkali metal hydrosulfides.

12. A process according to claim 11 wherein the amount of said organic monohalo compound added to said polymerization reaction mixture is sufficient to provide a molar ratio of said monohalo compound to said sulfur source in said admixture of about 0.001:1 to about 0.1:1.

13. A process according to claim 12 wherein siad polyhalo-substituted aromatic compound is selected from the group consisting of p-dihalobenzenes having the formula:

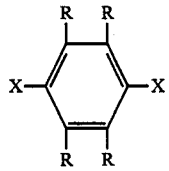

m-dihalobenzenes having the formula

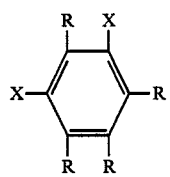

, o-dihalobenzenes having the formula

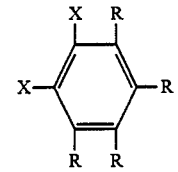

, and mixtures thereof wherein X is a halogen selected from the group consisting of chlorine, bromine and iodine, and R is selected from the group consisting of hydrogen and an alkyl radical of 1-4 carbon atoms.

14. A process according to claim 13 wherein said polar organic compound is selectd from the group consisting of amides, sulfones and ureas.

15. A process according to claim 14 wherein said organic monohalo compound comprises 4-chlorobenzophenone, said polar organic compound comprises N-methyl-2-pyrrolidone, said polyhalo-substituted aromatic compound comprises p-dichlorobenzene and said sulfur source comprises sodium hydrosulfide.

16. A process according to claim 15 wherein said polymerization conditions include a temperature of about 125° C. to about 375° C. and a time of about 0.1 hour to about 72 hours.

17. An arylene sulfide polymer produced by the method of claim 10 having an extrusion rate of at least about 50 g/10 minutes.

18. An arylene sulfide polymer produced by the method of claim 10 having an extrusin rate of about 75 to about 1,000 g/10 minutes.

19. A process for preparing arylene sulfide polymer comprising adding, prior to substantial completion of polymerization, at least one organic monohalo compound to a polymerization reaction mixture comprised of at least one sulfur source, at least one polyhalo-substituted aromatic compound, and at least one polar organic compound;

wherein said organic monohalo compound is selected from the group of compounds represented by the formulas:

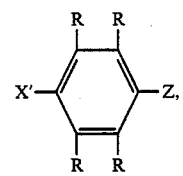 I

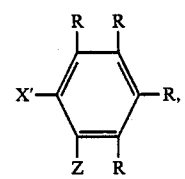 II and

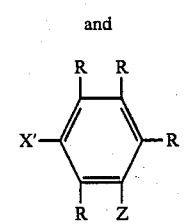 III wherein X' is a halogen selected from the group consisting of fluorine, chlorine, bromine and iodine; R is selected from the group consisting of hydrogen and an alkyl group of 1-4 carbon atoms; and Z is an activating group selected from the group consisiting of

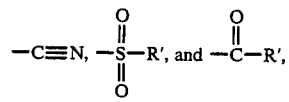

where R' is selected from the group consisting of phenyl, an alkyl radical of 1-12 carbon atoms, phenyl attached to the ring bearing X' by a valence bond or an alkylene group of 1-12 carbon atoms, and an alkyl radical of 1-12 carbon atoms attached to the ring bearing X' by a valence bond or an alkylene bridging group of 1-12 carbon atoms;

and recovering said arylene sulfide polymer from said polymerization reaction mixture.

20. A method for increasing the extrusion rate of arylene sulfide polymer prepared by subjecting components comprised of at least one sulfur source, at least one polyhalo-substituted aromatic compound, and at least one polar organic compound to polymerization conditions sufficient to produce said arylene sulfide polymer, said method comprising adding as a further component at least one organic monohalo compound selected from the group of compounds represented by the formulas:

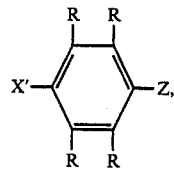 I

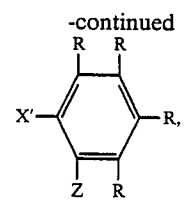 II and

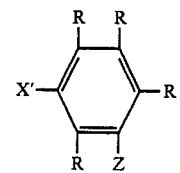 III wherein X' is a halogen selected from the group consisting of fluorine, chlorine, bromine and iodine; R is selected from the group consisting of hydrogen and an alkyl group of 1-4 carbon atoms; and Z is an activating group selected from the group consisting of

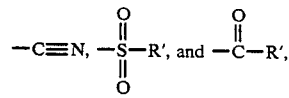

where R' is selected from the group consisting of phenyl, an alkyl radical of 1-12 carbon atoms, phenyl attached to the ring bearing X' by a valence bond or an alkylene bridging group of 1-12 carbon atoms, and an alkyl radical of 1-12 carbon atoms attached to the ring bearing X' by a valence bond or an alkylene bridging group of 1-12 carbon atoms.

21. A method according to claim 20 wherein said organic monohalo compound is added after polymerization has started but prior to substantial completion of polymerization.

* * * * *

UNITED STATES PATENT AND TRADEMARK OFFICE
CERTIFICATE OF CORRECTION

PATENT NO. : 4,820,800

DATED : April 11, 1989

INVENTOR(S) : Jon F. Geibel and Guy Senatore

It is certified that error appears in the above-identified patent and that said Letters Patent is hereby corrected as shown below:

In claim 1, column 9, line 14, please change the word "iodien" to --- iodine ---.

In claim 1, column 9, line 26, in between the words "phenyl" and "to" please insert --- attached ---.

In claim 5, column 10, line 15, in between the words "group" and "of" please insert --- consisting ---.

In claim 12, column 11, line 40, in between the words "said" and "monohalo" please insert --- organic ---.

In claim 19, column 13, line 16, in between the words "alkylene" and "group" please insert --- bridging ---.

Signed and Sealed this

Third Day of July, 1990

Attest:

HARRY F. MANBECK, JR.

*Attesting Officer*     *Commissioner of Patents and Trademarks*